United States Patent [19]

McConica et al.

[11] Patent Number: 5,710,425
[45] Date of Patent: Jan. 20, 1998

[54] DUAL RESOLUTION SCANNER WITH LIGHT SOURCE AND PIVOTING MIRROR IN LID

[75] Inventors: Charles H. McConica; Donald James Stavely, both of Fort Collins; Daniel Maack Bloom, Loveland, all of Colo.

[73] Assignee: Hewlett-Packard Company, Palo Alto, Calif.

[21] Appl. No.: 551,220

[22] Filed: Oct. 31, 1995

[51] Int. Cl.$^6$ .................................................. H04N 1/04
[52] U.S. Cl. ........................ 250/234; 358/487; 358/506
[58] Field of Search ............................ 250/234; 358/487, 358/506, 475, 474, 494; 355/57, 56, 55, 60, 66, 45

[56] References Cited

U.S. PATENT DOCUMENTS

| | | | |
|---|---|---|---|
| 5,113,268 | 5/1992 | Yoshida et al. | 358/474 |
| 5,296,943 | 3/1994 | Goebel et al. | 358/471 |
| 5,430,289 | 7/1995 | Erickson et al. | 250/205 |
| 5,532,846 | 7/1996 | Brook et al. | 358/497 |
| 5,574,274 | 11/1996 | Rubley et al. | 250/234 |

Primary Examiner—Edward P. Westin
Assistant Examiner—Alan L. Giles
Attorney, Agent, or Firm—Patrick J. Murphy

[57] ABSTRACT

An apparatus providing the capability to scan media at different resolutions is presented. The apparatus comprises an image area which is disposed between scanner lid and a scanner base, the lid is pivotally attached to the base to provide easy access to the image area. A light source resides within the scanner lid. Two separate light paths are provided, the first light path is reflected off opaque targets, through the lid before entering the base and onto an array of photosensitive devices. The second light path is passed through transparent media, into the base and onto the array. First and second focusing lenses are provided, each for a light path. The focusing lenses provide two separate magnifications which yield two separate resolutions.

11 Claims, 5 Drawing Sheets

DUAL RESOLUTION SCANNER WITH LIGHT SOURCE AND PIVOTING MIRROR IN LID

FIELD OF THE INVENTION

The present invention relates generally to optical scanners and more particularly to a scanner which can scan media at different resolutions.

BACKGROUND OF THE INVENTION

An optical scanner is used to generate machine-readable data which is representative of a scanned object such as a document or photograph. This is typically accomplished by employing a controlled light source located within the base of the scanner. The light source is reflected off the surface of a document and back onto an array of photosensitive devices which convert the light intensity into an electronic signal. Other scanner configurations include transmitting the light source through a transparent document, and then onto the array of photosensitive devices The intensity of the light source is controlled, via a closed loop or an open loop, by utilizing calibration circuitry located within the scanner base.

Optical scanners and various components used within such scanners are disclosed in U.S. Pat. No. 4,926,041 for OPTICAL SCANNER of David W. Boyd; U.S. Pat. No. 4,937,682 for METHOD AND APPARATUS FOR PROVIDING CONTRAST/INTENSITY CONTROL IN A DOCUMENT SCANNER of Dan L. Dalton; U.S. Pat. No. 5,019,703 for OPTICAL SCANNER WITH MIRROR MOUNTED OCCLUDING APERTURE OR FILTER of David W. Boyd and John S. Deutschbein; and U.S. Pat. No. 5,038,028 for OPTICAL SCANNER APERTURE AND LIGHT SOURCE ASSEMBLY of David W. Boyd and C. William Eider, Jr.

SUMMARY OF THE INVENTION

The present invention provides a scanner which scans media at different resolutions. The scanner provides more than one light path with each light path having a different lens reduction ratio. In a preferred embodiment, the scanner comprises at least two lenses and a single photodetector array. The present scanner has at least two scanning modes, one for transparencies and another for reflective, or opaque, objects.

An infeed lever moves mechanical components to allow selected media-type to be inserted. This lever prevents media-types other than the selected type from being inserted. Additionally, the proper infeed speed for the selected media-type is determined by the infeed lever.

In a preferred embodiment, the scanner has first and second light paths, the first light path reflects off opaque targets, the second light path passes through transparent targets. The first light path passes through a first focusing lens which has a characteristic first magnification. The second light path passes through a second focusing lens which has a characteristic second magnification. Both light paths are processed by the same photodetector array. In a preferred embodiment the first and second magnifications are different.

DETAILED DESCRIPTION OF THE PREFERRED EMBODIMENT

Figure 1A:
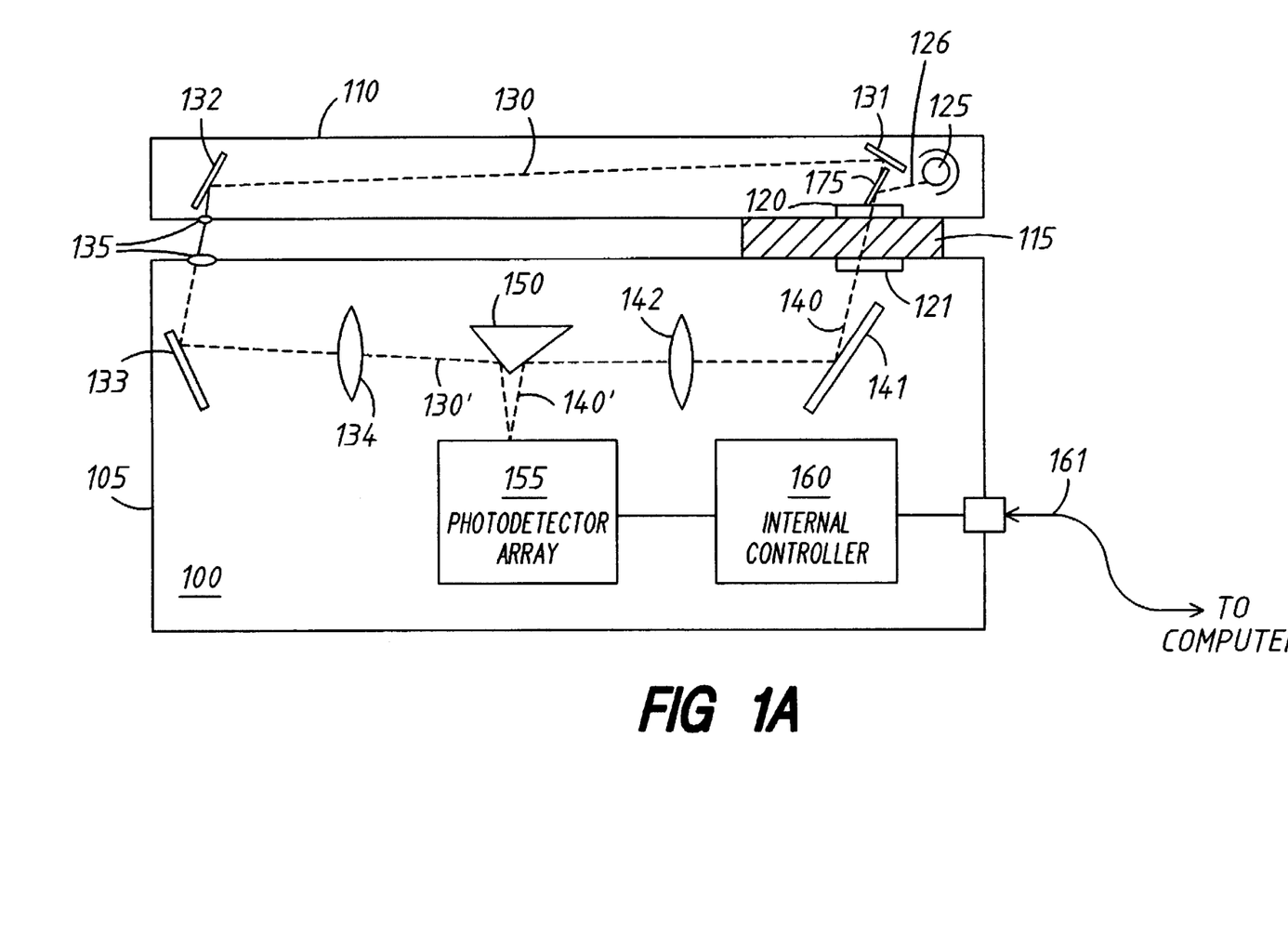
FIGs. 1a and 1b show a block diagram of an exposed side view of an optical scanner according to the present invention.
Figure 1B:
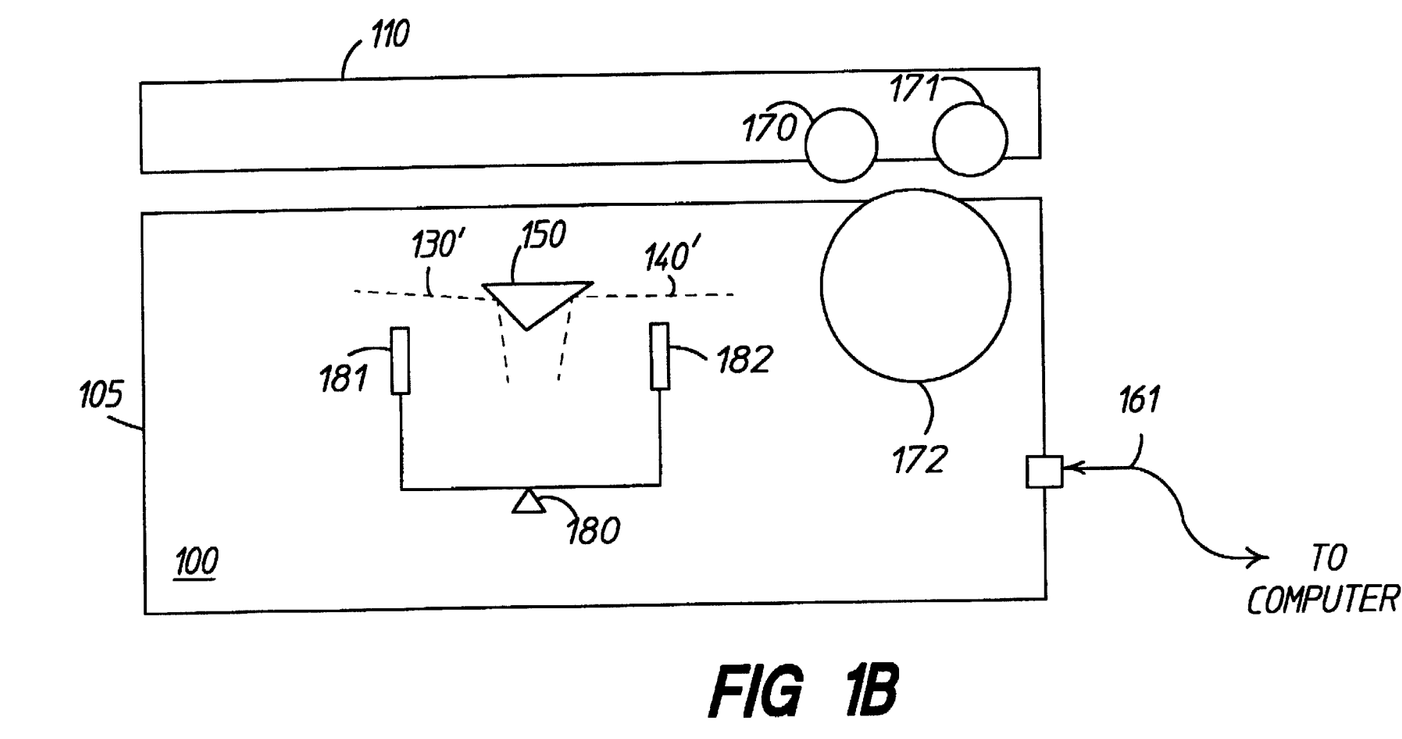

FIGs. 1a and 1b illustrate an optical scanner 100 of a type adapted to produce machine readable data representative of a color image of an object which is scanned. The machine readable data produced by the scanner 100 is adapted to be received and used by a digital computer in a conventional manner, for example, the data may be stored on a computer memory device or may be used to produce a color display of the object on a CRT or a color print.

FIGs. 1a and 1b show a block diagram of a side view of the optical scanner according to the present invention. Scanner 100 has a scanner base 105 and a scanner lid 110. The lid 110 is attached to the base 105 via a hinge (not shown) such that the lid 110 can pivot about a center axis of the hinge; this permits easy access to the image area (i.e., that area disposed between the base 105 and the lid 110). The hingeably-attached lid 110 ensures manual access to any target media in the image area. A target medium 115 is disposed between first transparent platen 120 and second transparent platen 121 in the image area.

A lamp 125 projects a narrow line of light off a pivoting illumination mirror 175, through the first platen 120 and onto the surface of the target 115. If the target 115 is opaque, as in the case of a document or photograph, the pivoting illumination mirror 175 pivots into a vertical configuration to allow the light (illustrated by light path 130) to be reflected off the surface of the target 115, onto mirrors 131 and 132. The pivoting illumination mirror 175 is supported by mirror posts as will be discussed below in FIG. 4. The light is then reflected off mirror 132, through apertures 135 and onto mirror 133. These mirrors 131,132,133 reflect the light through a first focusing lens 134 onto mirror 150. The light is then reflected onto photodetector array 155. In a preferred embodiment, the target 115 moves past a stationary lamp 125 via drive roller 172 and idlers 170,171 for detection by the photodetector array 155.

Photodetector array 155 converts light intensity into an electrical signal for an internal controller 160 which, among other things, controls the power to the lamp 125, and adjusts in accordance with the photo-detector electrical signal. In a preferred embodiment, the photodetector array 155 comprises charged-coupled devices (CCDs). In another preferred embodiment, the CCDs are capable of processing 2700 pixels. The internal controller 160 may send image data to a microprocessor-based system, including a computer or a printer, via link 161. In a preferred embodiment, the link 161 is compatible with the SCI bus protocol (akin to RS-232). Other bus protocols, such as SCSI and HPIB could be used without departing from the scope of the present invention. The computer, or other device, can also send commands to the internal controller 160 via link 161.

If the target 115 is transparent, as in the case of a 35 mm slide or negative strip, the light (illustrated by fight path 140) is reflected off the pivoting illumination mirror 175 (configured in an angled configuration as shown), passed through the first platen 120, through the transparent target 115, through the second platen 121 and onto mirror 141. Mirror 141 then reflects the light through a second focusing lens 142 onto mirror 150. This light is then reflected onto the photodetector array 155 for processing. In a preferred embodiment, the magnification of the first focusing lens 134 is different from the magnification of the second lens 142. In another preferred embodiment, the magnification of the first focusing lens is 0.165X and the magnification of the second focusing lens 142 is 0.7559X.

An obstructor 180 is disposed below the mirror 150. Obstructor 180 comprises first and second blocking panels 181,182. Based upon a control signal sent from an infeed lever control (see FIG. 2), one of the focused light paths will be obstructed. If the control signal indicates that a transparent target is to be scanned, obstructor 180 positions blocking panel 181 in the path of the focused opaque light path 130'. If the control signal indicates that an opaque target is to be scanned, obstructor 180 positions blocking panel 182 in the path of the focused transparency light path 140'.

A feature of the present invention is the dual light paths 130,140. The resolutions provided by these separate light paths are dependent on the target being scanned. Typically, there is less information present on a photograph than on a slide. In a preferred embodiment, the opaque light path 130 provides a resolution to 300 dots per inch (dpi) while the transparency light path 140 provides a resolution to 2400 dpi.

Figure 2:
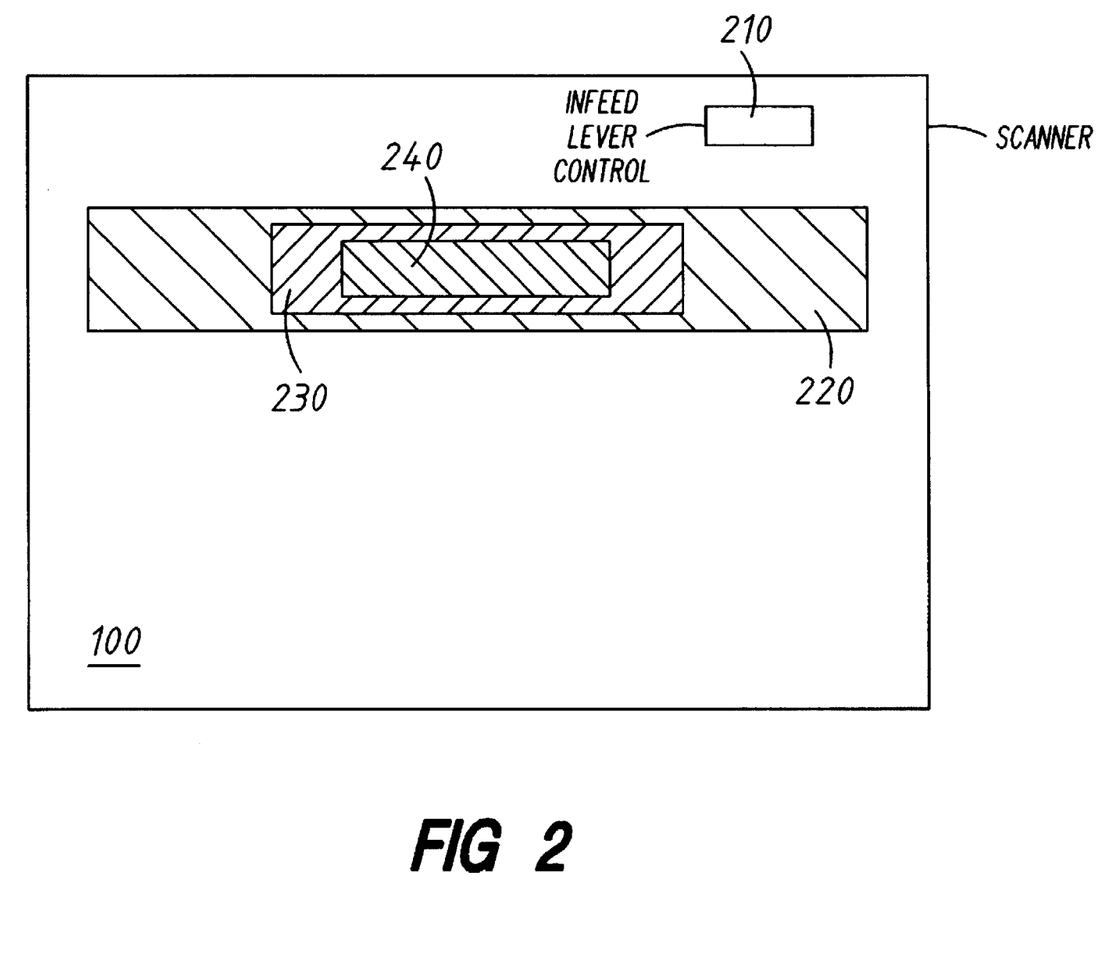
FIG. 2 shows a block diagram of a front view of the optical scanner.

FIG. 2 shows a block diagram of a front view of the optical scanner according to the present invention. The scanner 100 provides an infeed lever control 210 which determines which selectable media-type can be inserted. An infeed lever (not shown) moves mechanical components based upon the control signal sent by control 210 to allow the selected media-type to be inserted into the scanner 100. At the same time, control 210 prevents other, non-selected, media-types from entering the scanner 100. A feature of the present invention is that scanner 100 is mechanically reconfigurable to permit and/or deny access to the scanning mechanism (i.e., the light paths, mirrors, photodetector array and controller). Once the end-user of scanner 100 selects which media-type is to be scanned, the scanner 100 presents the requisite slot for the end-user to enter that selected media-type.

Additionally, control 210 sets the speed with which the selected media-type is entered and sends a control signal to the obstructor (item 180 in FIG. 1b) to block the light path of the nonselected media-type. Scanner 100 accepts three separate media-types through an input port that has three different configurations 220,230,240. In a preferred embodiment, scanner 100 accepts a print photograph (item 220) up to the dimensions of 5"×7" (127 mm by 177.8 mm), a 35 mm slide (item 230), and a 35 mm negative strip (item 240). In a preferred embodiment, the speed with which a print photograph is entered is faster than with respect to a 35 mm slide or 35 mm negative strip. In another preferred embodiment, a print photograph is scanned at 0.003 inches/second (0.076 mm/sec) while a 35 mm slide or negative strip is scanned at 0.00042 inches/second (0.01058 mm/sec).

Figure 3:
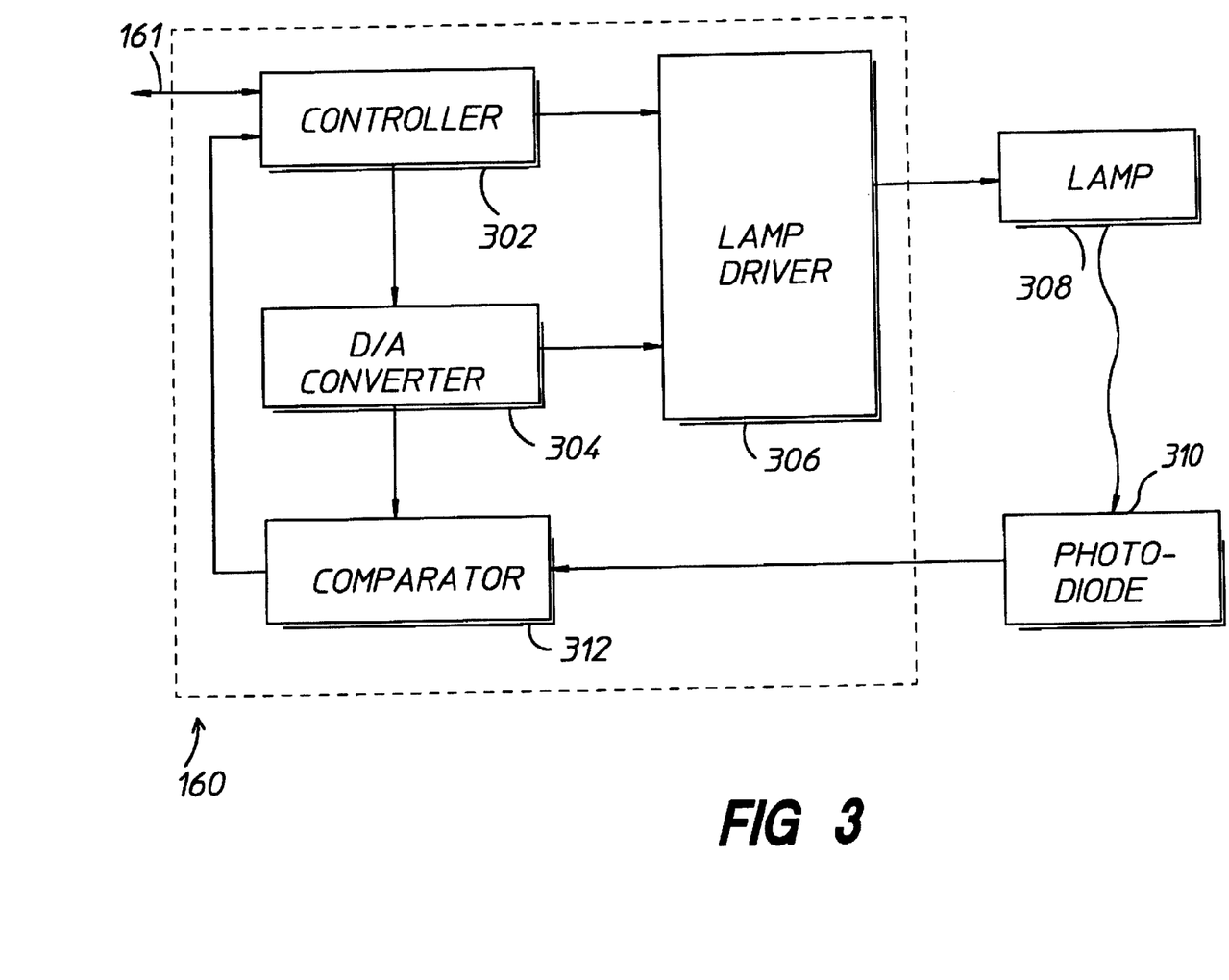
FIG. 3 shows a block diagram of the control block according to the present invention.

FIG. 3 shows a block diagram of the control block. The control block 160 is centered around a microcontroller 302. The microcontroller 302 may be, for example, a 68HC05 microcontroller available from Motorola, Inc., Schaumburg, Ill. The microcontroller 302 receives commands from the scanner via the serial communications link 161. Commands sent from the scanner include, among other things, turning on the lamp, change light intensity, and report status.

The microcontroller 302 drives a digital-to-analog converter (DAC) 304 and a lamp driver 306. One output of the DAC 304 is connected to the lamp driver 306, while a second DAC output is connected to a comparator 312. The comparator 312 also receives input from a photodiode which measures the light intensity of the lamp 308 and converts it to an analog signal. This signal is then supplied to the comparator 312 as feedback to maintain the light intensity of the lamp 308 at a constant level.

Figure 4:
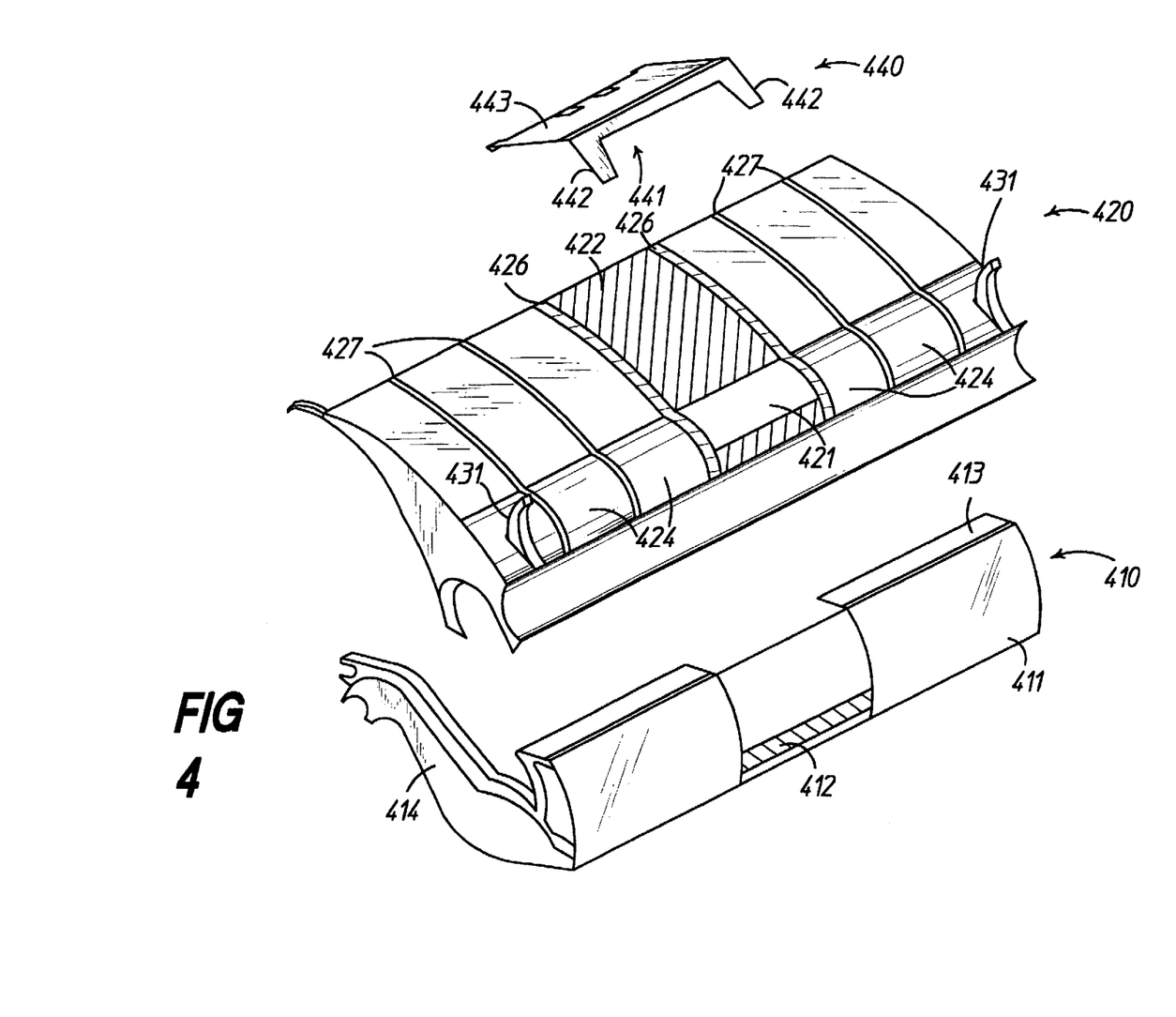
FIG. 4 shows an exploded view of the mechanical components for facilitating the scanning of multiple media.

FIG. 4 shows an exploded view of the mechanical assembly for facilitating the scanning of multiple media. The mechanical assembly is located in the scanner base 105 and comprises a negative cap 440, a carriage 420, and a gill 410. The gill 410 comprises a front face 411, a slide base 412, a print ledge 413 and a cam 414. The negative cap 440 comprises an aperture rise 441, at least two posts 442 and a top portion 443. The carriage 420 comprises an aperture 421, first and second negative guide plates 422,423, a plurality of roller apertures 424, negative guide sides 426, a plurality of guides 427 and at least two mirror support posts 431. The plurality of guides 427 support the target media that is placed in the scanner. The at least two mirror support posts 431 support the pivoting illumination mirror (item 175 in FIG. 1a), the mirror pivoting as the mechanical assembly moves upward and downward with respect to the control signal from control 210. In a preferred embodiment, the negative cap 440, the carriage 420 and the gill 440 are all formed of plastic, although other materials could be used without departing from the scope of the present invention.

Depending on which media-type was selected (via control 210), the mechanical assembly moves to permit the selected media-type to enter the scanner and, at the same time, prohibit the nonselected media-types from entering. In a preferred embodiment, there are three media-types: print photograph, 35 mm slide, and 35 mm negative strip.

If the print photograph media-type has been selected, gill 410 is driven by the cam 414 downward in relation to carriage 420 so that the print photograph can be fed along prim ledge 413. The drive roller (item 172 in FIG. 1b), which is positioned in the plurality of roller apertures 424, moves the print photograph along through the scanner 100. After scanning the print photograph, the drive roller reverses direction to send the print photograph back out from the scanner 100. In a preferred embodiment, the drive roller is a single roller having a plurality of large diameter sections, corresponding to the plurality of roller apertures 424, interconnected by a plurality of small diameter sections. Additionally, the drive roller has two internal sections that are positioned on the inside of the negative guide sides 426. In a preferred embodiment, the two internal sections have the same diameter as the large diameter sections and each has a width sufficiently thin enough to ensure that light path 140 (see FIG. 1a) is not hindered as it passes through the transparent media, through aperture 421 and onto the internal mechanisms of the scanner. In another preferred embodiment, the drive roller is comprised of a plurality of separate rollers interconnected via an roller axle.

If the 35 mm slide media-type has been selected, gill 410 is driven by the cam 414 upward relative to the carriage 420 to permit the 35 mm slide to be positioned on the slide base 412 before the internal sections of the drive roller moves the slide into, and then out from, the scanner. If the 35 mm negative strip media-type is selected, gill 410 is driven by the cam 414 further upward relative to the carriage 420 and the negative cap 440. First and second negative guide plates 422, 423, in conjunction with the negative guide sides 426 ensure that proper alignment of the negative strip is achieved across aperture 421. In a preferred embodiment, the negative guide plates 422,423 are at least 35 millimeters apart.

A feature of the present invention is that the same mechanical assembly is used to move different media-types across the scanning aperture. That is, the roller, carriage 420 and gill 410 are designed to transport print photographs up to a size of 5"×7" (127 mm×177.8 mm), 35 mm slides and 35 mm negative strips.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects. For example, a moveable lens can be provided in place of the first and second focusing lenses (items 134 and 142 in FIG. 1*a*). In this configuration, the moveable lens can be moved from a first position in light path 130 through to a Nth position in light path 140 using an actuator. N positions throughout the path of the moveable lens can be used to provide a "zoom" for infinitely variable resolutions.

We claim:

1. A document scanner comprising:

a scanner base;

a scanner lid attached to the scanner base;

an image area disposed between the scanner base and the scanner lid;

first and second light paths, the first light path reflects off the image area, the second light path passes through the image area;

a pivoting mirror located in the scanner lid, the pivoting mirror pivots between at least two positions, the second light path reflects off of the pivoting mirror through the image area;

first and second focusing lenses, the first focusing lens is located in the first light path, the second focusing lens is located in the second light path;

a photodetector array, the array residing within the scanner base, the array generates an electrical signal from the first and second light paths; and a controller for controlling a light source, the controller residing within the scanner base and being electrically connected to the photodetector array and the light source, the light source generates the first and second light paths.

2. The document scanner of claim 1, wherein the control means comprises:

a microcontroller electrically connected to a microprocessor;

a digital-to-analog converter connected to the microcontroller; and a lamp driver, connected to the controller and the digital-to-analog converter, for providing a desired intensity to the fight source, the light source generating an actual intensity.

3. The document scanner of claim 2, wherein the controller further comprises a comparator, connected to the digital-to-analog converter and the microcontroller, for comparing the desired fight intensity and the actual light intensity.

4. A document scanner for scanning media at different resolutions, the scanner comprising:

a scanner base;

a scanner lid attached to the scanner base;

an image area disposed between the scanner base and the scanner lid;

a light source residing within the scanner lid;

a pivoting mirror located within the scanner lid, the pivoting mirror pivots between two positions, the fight source generating first and second light paths, the first fight path generated by reflecting off the image area, the second light path generated by reflecting off the pivoting mirror and through the image area; and first and second focusing lenses located within the scanner base, the first focusing lens having a first magnification, the second focusing lens providing a second magnification, the first focusing lens located within the first light path, the second focusing lens located within the second light path.

5. The document scanner of claim 4, further comprising a media-type selector for selecting a media type to be placed in the image area.

6. The document scanner of claim 5, wherein the media-type selector can select between a print photograph, a 35 mm. slide and a 35 mm negative strip.

7. The document scanner of claim 6, wherein the first light path illuminates the print photograph.

8. The document scanner of claim 7, wherein the second light path illuminates the 35 mm slide and 35 mm negative strip.

9. The document scanner of claim 8, further comprising an obstructor, the obstructor has first and second blocking panels, the second panel obstructs the second light path when media-type selector selects the print photograph, the first panel obstructs the first light path when the media-type selector selects either the 35 mm slide or the 35 mm negative strip.

10. A scanner comprising:

a scanner base;

a scanner lid attached to the scanner base;

an image area disposed between the scanner base and the scanner lid;

a light source located within the scanner lid, the light generates first and second light paths, the first light path reflects off the image area, the second light path passes through the image area; and a pivoting mirror located in the scanner lid, the pivoting mirror pivots between at least two positions, the second light path reflects off of the pivoting mirror through the image area.

11. The scanner of claim 10 further comprising:

first and second focusing lenses, the first focusing lens is located in the first light path, the second focusing lens is located in the second light path;

a photodetector array, the array residing within the scanner base, the array generates an electrical signal from the first and second light paths; and a controller for controlling the light source, the controller residing within the scanner base and being electrically connected to the photodetector array and the light source.

* * * * *

UNITED STATES PATENT AND TRADEMARK OFFICE
CERTIFICATE OF CORRECTION

PATENT NO.  : 5,710,425
DATED       : January 20, 1998
INVENTOR(S) : Charles H. McConica et al.

It is certified that error appears in the above-identified patent and that said Letters Patent is hereby corrected as shown below:

ABSTRACT,
Line 7, delete "fight" and insert therefor -- light --

Column 1,
Line 21, after "devices" insert -- . --
Line 36, delete "Eider" and insert therefor -- Elder --

Column 2,
Line 62, delete "fight" and insert therefor -- light --

Column 3,
Line 18, delete "fight" and insert therefor -- light --
Line 19, delete "fight" and insert therefor -- light --
Line 57, delete "mm/see" and insert therefor -- mm/sec --

Column 4,
Line 4, delete "fight" and insert therefor -- light --
Line 6, delete "fight" and insert therefor -- light --
Line 37, delete "prim" and insert therefor -- print --

Column 5,
Line 55, delete "fight" and insert therefor -- light --
Line 61, delete "fight" and insert therefor -- light --

UNITED STATES PATENT AND TRADEMARK OFFICE
CERTIFICATE OF CORRECTION

PATENT NO. : 5,710,425 B1
DATED : April 20, 2001
INVENTOR(S) : Charles H. McConica et al.

It is certified that error appears in the above-identified patent and that said Letters Patent is hereby corrected as shown below:

<u>Column 6,</u>
Line 9, delete "fight" and insert therefor -- light --
Line 11, delete "fight" and insert therefor -- light --
Line 24, after "mm" delete -- . --

Signed and Sealed this

Twenty-seventh Day of November, 2001

Attest:

NICHOLAS P. GODICI
Attesting Officer                    Acting Director of the United States Patent and Trademark Office